W. M. McGIBBON.
WEED CUTTER FOR RAILROAD TRACKS.
APPLICATION FILED SEPT. 21, 1908.
987,899
Patented Mar. 28, 1911.
2 SHEETS—SHEET 1.
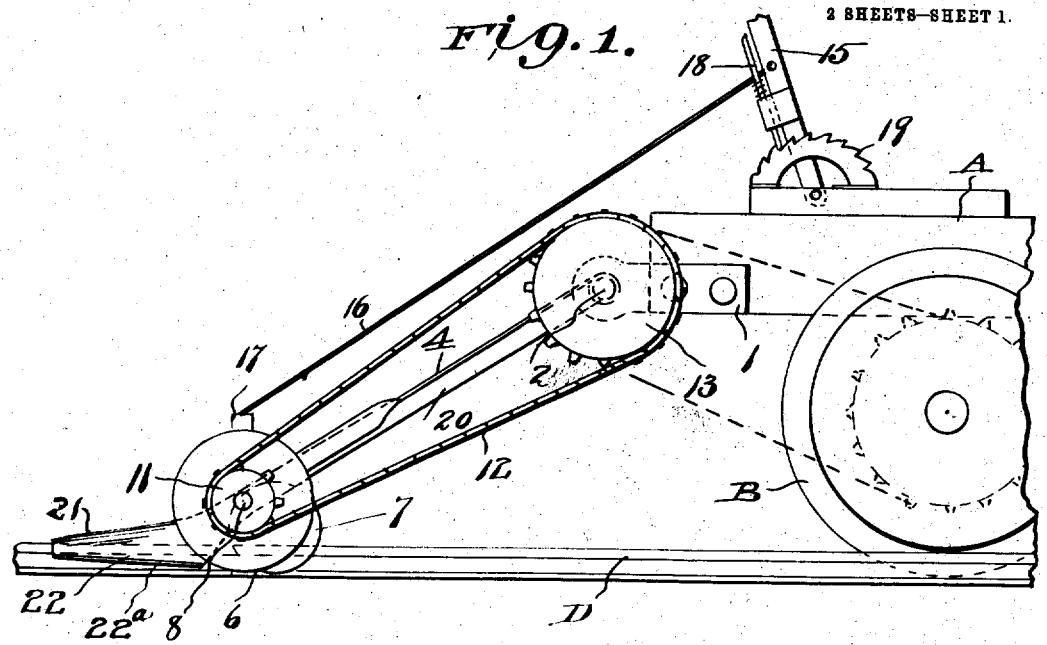
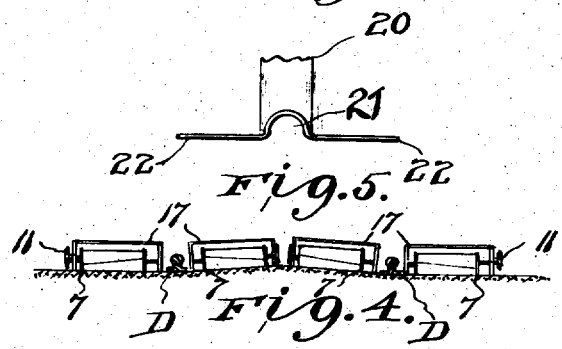
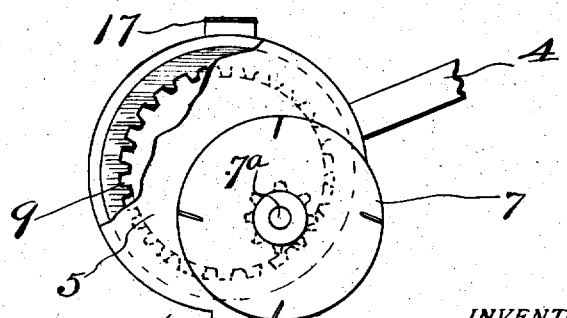
WITNESSES
INVENTOR
William M. McGibbon
by D. A. Gourick
Attorney

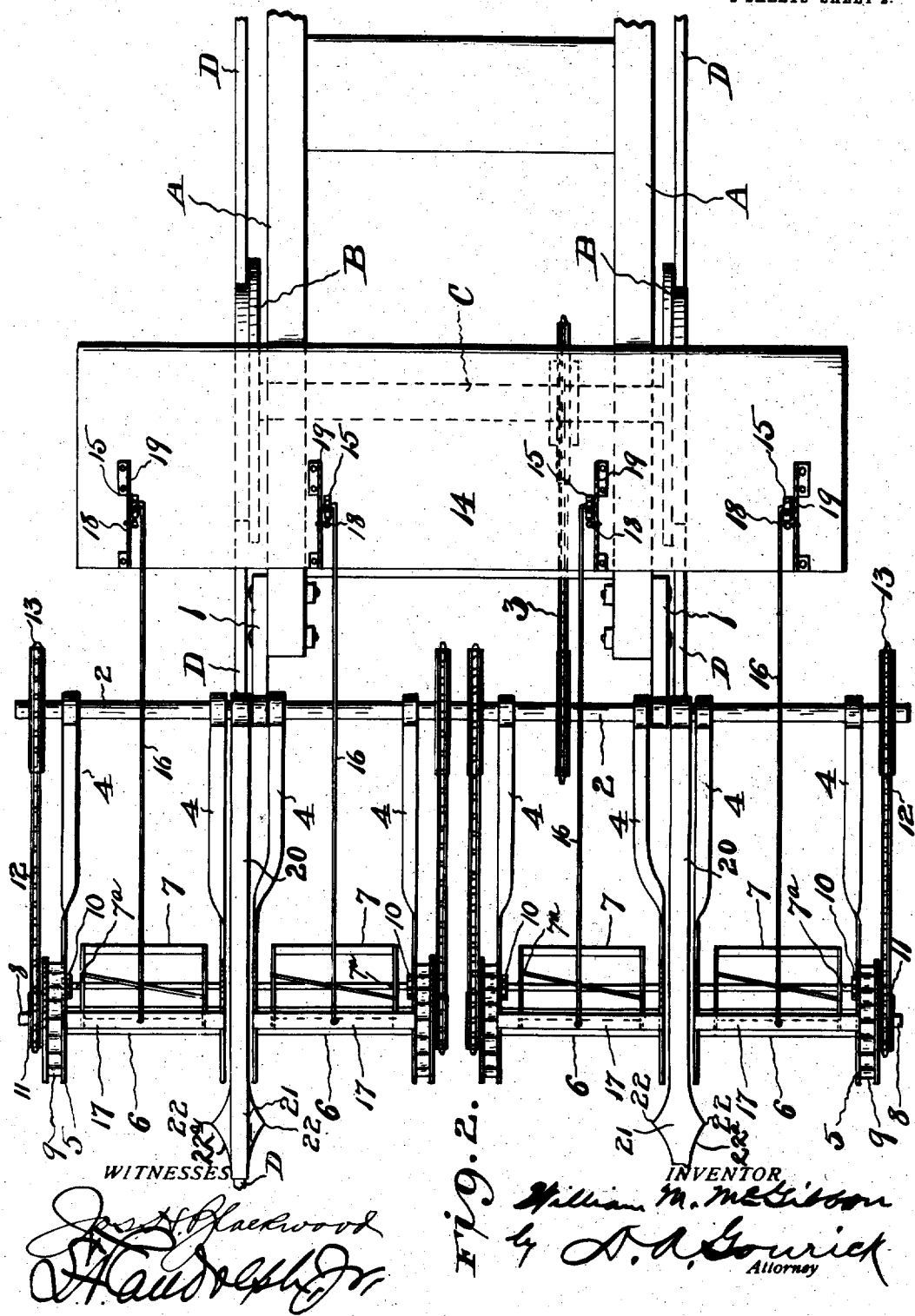

UNITED STATES PATENT OFFICE.

WILLIAM M. McGIBBON, OF GIBBON, OKLAHOMA.

WEED-CUTTER FOR RAILROAD-TRACKS.

987,899.

Specification of Letters Patent. Patented Mar. 28, 1911.

Application filed September 21, 1908. Serial No. 453,943.

*To all whom it may concern:*

Be it known that I, WILLIAM M. McGIBBON, a citizen of the United States, residing at Gibbon, in the county of Grant and State of Oklahoma, have invented certain new and useful Improvements in Weed-Cutters for Railroad-Tracks, of which the following is a specification.

My invention relates to machines for cutting the grass and weeds between and along railroad tracks and has for its object the provision of a device removably secured to a car truck and consisting of a shaft suitably journaled, and geared to one of the axles of the truck, with mower attachments supported on the shaft and operated by gearing connected to the shaft.

The construction and operation of my improved device will be described hereinafter and illustrated in the accompanying drawings in which—

Figure 1 is a side view of a car truck showing my improved weed cutter attached thereto, Fig. 2, a top plan view thereof, Fig. 3, a fragmental front view of one of the rods for throwing the grass and weeds away from the rails, Fig. 4, a detail view of one of the cutting attachments showing the gearing for operating the cutting mechanism, and Fig. 5 a diagrammatic view of the front of the cutters showing their arrangement between the rails when the road-bed is graded from each side of the middle of the track downwardly to the rails.

In the drawings similar reference characters indicate corresponding parts in the several views.

A indicates a truck supported on wheels B attached to axles C.

1 indicates arms secured to truck A having a shaft 2 journaled therein that is geared to axle C by means of chain and sprocket gearing 3.

4 indicates arms pivotally secured to shaft 2, each pair of rods having a cutting apparatus secured to their free ends consisting of a disk 5 secured to each arm 4 having a blade 6 connecting the pairs of disks and the reel 7 journaled thereon.

8 indicates a stub shaft secured to one of the disks 5 of each cutting apparatus on which is journaled an internal spur gear wheel 9 that meshes with a pinion 10 on the end of the shaft 7ª of reel 7.

11 indicates a sprocket wheel secured to each gear wheel 9 and 12 a chain geared to each sprocket wheel 11 and to a sprocket wheel 13 on shaft 2.

14 indicates a platform removably secured to truck A having levers 15 fulcrumed thereon that are connected to the several cutting apparatuses by means of rods 16 secured to cross-bars 17 connecting the pairs of disks of each apparatus. Each lever 15 has a sliding spring actuated pawl 18 mounted thereon that engages notches in segmental plate 19 secured to the platform 14 to hold the lever 15 in adjusted positions.

20 indicates rods loosely secured to shaft 2 and having their free ends grooved as shown at 21 to engage the rails D and having horizontal wings 22 extending at each side of the grooved portion 21 with slanting edges 22ª that throw the grass and weeds away from the tracks and toward the cutting machines.

As shown in the drawings four cutting machines are employed, two between the rails and one on each side of the track and the machines between the rails are secured so that they are higher in the middle of the track than next to the rails to accommodate the cutting apparatuses to the usual pitch of the road bed between the rails. It will also be apparent that the cutting machines may be raised individually out of operative position and returned as the work to be performed requires, the levers 15 being utilized for that purpose.

Having thus described my invention what I claim is—

In combination with a railroad car having wheel supported trucks, arms removably secured to the truck at one end of the car, a shaft journaled in said arms and operated by the truck wheels, a plurality of arms loosely mounted on said shaft, cutting apparatuses secured to said arms, gearing connecting the shaft and said cutting apparatuses, a platform removably secured to the truck, levers fulcrumed on the platform, cross bars secured to the individual cutting apparatuses, rods connecting the levers aforesaid and the cross-bars, rods loosely secured to the shaft and extending forwardly of the car, and the front ends of the rods grooved to ride on the railroad rails and having laterally extending wings with inclined front edges.

In testimony whereof I hereto affix my signature in the presence of two witnesses.

WILLIAM M. McGIBBON.

Witnesses:
I. R. HEASTY,
J. L. GODFREY.